July 21, 1959
S. A. COGSDILL
2,895,356
DEBURRING TOOL
Filed March 20, 1956
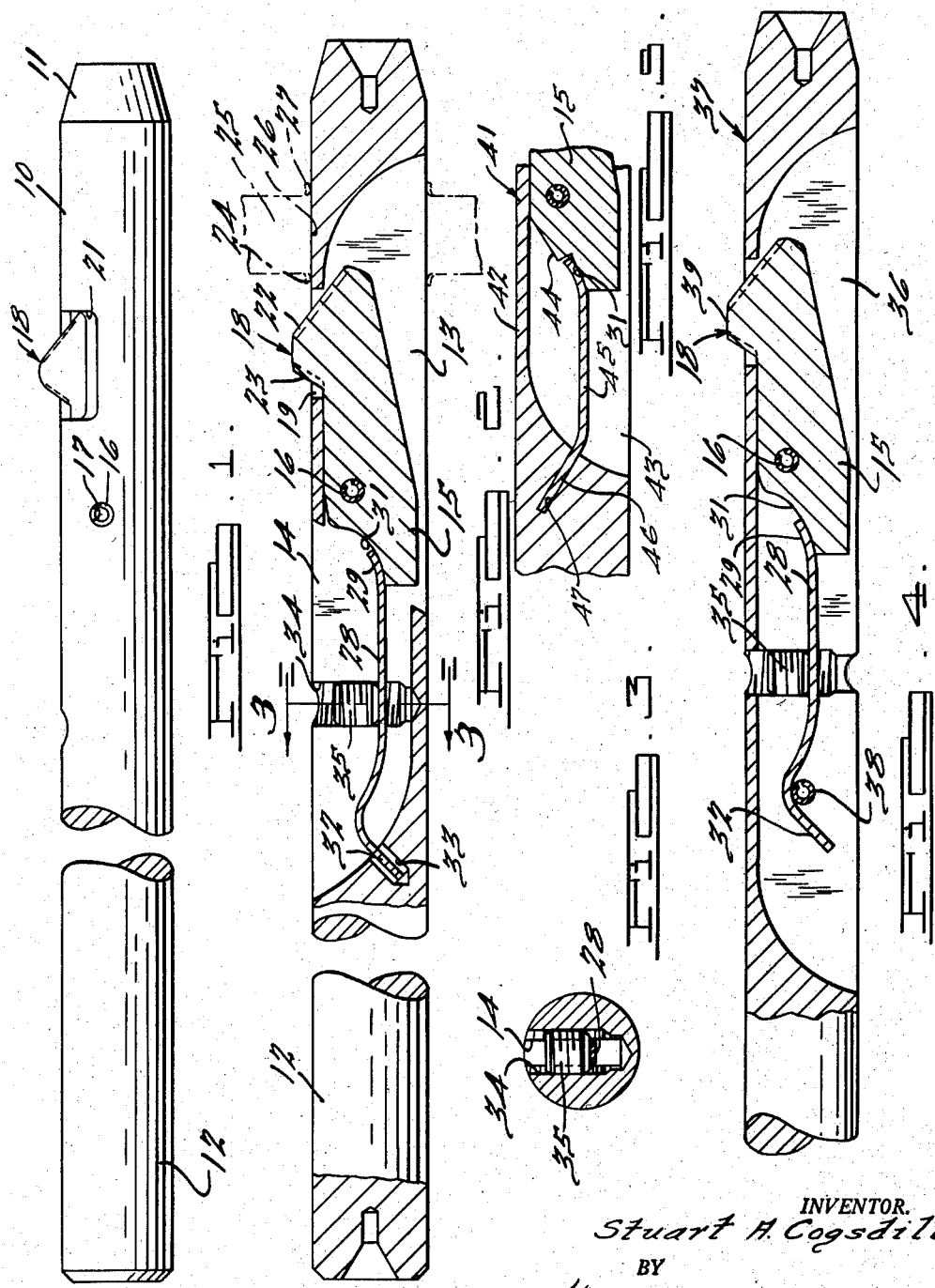
INVENTOR.
Stuart A. Cogsdill.
BY
Harness, Dickey & Pierce.
ATTORNEYS United States Patent Office 2,895,356
Patented July 21, 1959

2,895,356

DEBURRING TOOL

Stuart A. Cogsdill, Orchard Lake, Mich., assignor to Cogsdill Tool Products, Inc., Oak Park, Mich., a corporation of Michigan Application March 20, 1956, Serial No. 572,746

4 Claims. (Cl. 77—73.5)

This invention relates to deburring tools, and particularly to a deburring tool which is capable of removing burrs at the edges of an aperture and of machining a groove in the body of the aperture between the ends thereof.

In Patent 2,716,360, issued August 30, 1955, and assigned to the assignee of the present invention, a deburring tool is illustrated which produces the same functions of deburring as the present tool, with the present tool having certain improvements over the patented tool.

The improvements embody primarily a spring which applies a force to the deburring blade, which spring is readily adjustable so as to regulate the load on the cutting edges of the blade. The tool body is milled longitudinally either on one side or on opposite sides in a manner to provide an elongated slot in which the blade and spring are mounted in a manner to simplify the machining and assembly operations.

Accordingly, the main objects of the invention are: to provide a deburring tool having a cylindrical body with an elongated slot in which the deburring blade and the pressure applying spring are mounted; to form a deburring tool from a cylindrical bar having an elongated slot milled on the axis thereof in which a deburring blade is pivotally mounted and in which a spring is provided for applying pressure on the blade which is adjustable by a setscrew threaded into an aperture which is intersected by the slot, and, in general, to provide a deburring tool which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

Figure 1 is a view in elevation of a deburring tool having a pivoted blade embodying features of the present invention;

Fig. 2 is a sectional view of the structure illustrated in Fig. 1, taken through the longitudinal center thereof;

Fig. 3 is a sectional view of the structure illustrated in Fig. 2, taken on the line 3—3 thereof;

Fig. 4 is a view of structure, similar to that illustrated in Fig. 2, showing another form thereof, and Fig. 5 is a sectional view of structure, similar to that illustrated in Fig. 4, showing a further form of the invention.

Referring to Figs. 1, 2 and 3, the deburring tool of the present invention embodies a cylindrical body 10 having a truncated conical end 11 and a tool receiving end 12. A slot 13 is milled on one side of the blade through the central axis of the body 10 and a slot 14 is milled on the diametrically opposite side of the body 10 in a manner to communicate with the slot 13. A deburring blade 15 is mounted within the slot 13 on a pivot 16. The pivot is made of spring material in the form of a cylinder having spaced edges so as to lock within an aperture 17 through the body 10 of the tool. The cutting end 18 of the blade extends through a slot 19 through the body at the base of the slot 13, with one side of the body cut away at 21 to provide clearance for the chips which are cut from the ends of the aperture which forms the burrs. The advancing end 22 of the blade has a cutting edge thereon of greater slope than the cutting edge on the rear edge 23 of the blade, the greater angularity at the advancing edge functioning to deflect the blade on the pivot 16 as the advancing edge cuts the burr 24 from a workpiece 25 so that the cutting edge may pass through the aperture 26 of the workpiece to thereafter cut the burr 27 on the opposite side of the workpiece.

The cutting end 18 is moved outwardly of the body 10 by the pressure of a spring 28 which has an arcuate end 29 bearing against an arcuate surface 31 on the rear edge of the blade. The spring is deflected at 32 at the opposite end from that engaging the blade, which end is extended into an aperture 33 communicating with the slot 14 in which the spring is disposed. A threaded aperture 34 is provided in the body 10 intersected by the slot 14 and by the spring 28 disposed in the slot to be engaged by a screw 35 which is adjusted in the aperture 34 for regulating the pressure applied by the spring 28. Through the adjustment of the spring 28 by the screw 35, the force capable of being applied by the cutting edges 22 and 23 may be readily controlled.

In Fig. 4 a similar deburring tool is illustrated, the body having a slot 36 substantially the length of the combined slots 13 and 14 in the tool illustrated in Figs. 1 to 3. In the tool 37 illustrated in Fig. 4, the slot 36 is a continuous slot applied from one side of the tool body 10. In this arrangement, the end 32 of the spring 28 is disposed over a pin 38 which is similar to the pivot pin 16. The spring 28 in either of the embodiments may be made of a spring wire cylindrical in shape or may be flat of square or rectangular shape.

In the tool of Figs. 2 and 4, adjustment of the tension of the spring 28 is permissible by adjusting the screw 35. This provides an advantage when different metals and thicknesses of sheets or plates are to be deburred at different times. When used as a production tool when all the work is the same, a tool as illustrated in Fig. 5 is preferably employed. In this arrangement, the tool 41 has a body 42 containing a slot 43 similar to but of less length than the slot 36 of the tool of Fig. 4. The blade 15 has the arcuate surface 31 below an extending lip 44 to be disposed adjacent to the end of a spring 45. The opposite end of the spring has a straight portion 46 which is retained in an aperture 47 drilled or otherwise provided in the body inwardly of the slot 43. In this arrangement, the tension exerted by the spring is preset so that a fixed force is applied to the arcuate surface 31. This prevents misadjustment of the spring 15 which might occur if the workman were free to adjust the setscrew 35. A tool is constructed in this simplified manner for removing burrs from a workpiece on both sides of the sheet or plate, with the outer edge 39 crowned laterally so as not to damage the bore surface when passing therethrough. By slotting the body on the center line, a recess is provided for the reception of the blade and the spring, the spring urging the cutting edge outwardly of the body. The setscrew in engagement with the central portion of the spring regulates the force applied for urging the cutting edge outwardly of the body. With this simple construction, tools of small diameters may be readily constructed for removing the burrs from small apertures. The particular construction, however, is not limited to small diameter tools but tools of this construction may be made to remove burrs on apertures of large diameters.

What is claimed is:

1. A deburring tool including, in combination, a body having a slot of substantial length on the axis thereof, an aperture extending through the bottom of the slot adjacent to one end thereof, a deburring blade pivoted in the slot having a projecting cutting end extending from the bottom through the aperture to the outside of the body, and a longitudinally extending spring strip having one end fixedly supported within the slot with the opposite end engaging the end of the blade opposite to that having the projecting end, the end of said spring engaging said blade exerting a force thereon substantially perpendicular to the axis of said tool.

2. A deburring tool including, in combination, a body having a slot of substantial length on the axis thereof, an aperture extending through the bottom of the slot adjacent to one end thereof, a deburring blade pivoted in the slot having a projecting cutting end extending from the bottom through the aperture to the outside of the body, a longitudinally extending spring supported within the slot engaging the end of the blade opposite to that having the projecting end, and means for engaging the spring interjacent its ends for changing the force applied thereby to the blade.

3. A deburring tool including, in combination, a body having axially spaced slots cut therein from opposite sides in a common plane through the axis thereof, with one slot communicating with the end of the adjacent end of the other slot, the bottom of said slots being extended through the body to form an aperture, a blade pivoted within said one slot having a projecting cutting end extending from the bottom thereof through said aperture, and a spring strip having one end fixed in the other said slot with the other end engaging the blade for urging the projecting end from the aperture.

4. A deburring tool including, in combination, a body having slots cut therein from opposite sides in a common plane, with the end of one slot communicating with the end of the other slot, one of said slots being extended through the body to form an aperture, a blade pivoted within said one slot having a projecting cutting end extending from the bottom thereof through said aperture, a spring in the other said slot engaging the blade for urging the projecting end from said aperture, means for adjusting the tension of said spring, said adjusting means embodying a threaded aperture bisected by said slot and aligned substantially normal to the spring, and a screw within said aperture.

References Cited in the file of this patent

UNITED STATES PATENTS

| | | |
|---|---|---|
| 1,439,231 | Erickson | Dec. 19, 1922 |
| 2,314,084 | Fried | Mar. 16, 1943 |
| 2,360,424 | Kauffman | Oct. 17, 1944 |
| 2,620,689 | Cogsdill | Dec. 9, 1952 |
| 2,656,890 | Brandon | Oct. 27, 1953 |